G. R. DE LONG.
NUT.
APPLICATION FILED JUNE 8, 1920.

1,375,781.

Patented Apr. 26, 1921.

Inventor:
George R. DeLong,
By Chas. N. Butler
Attorney.

UNITED STATES PATENT OFFICE.

GEORGE R. DE LONG, OF HARRIMAN, PENNSYLVANIA.

NUT.

1,375,781. Specification of Letters Patent. Patented Apr. 26, 1921.

Application filed June 8, 1920. Serial No. 387,484.

*To all whom it may concern:*

Be it known that I, GEORGE R. DE LONG, a citizen of the United States, residing at Harriman, in the county of Bucks and State of Pennsylvania, have invented an Improved Nut, of which the following is a specification.

My invention is a nut designed to permit its quick engagement and release with relation to a coacting bolt. It is characterized by its construction, comprising an opening transverse to the axis of its threads, whereby it is adapted to be engaged and disengaged by moving it transversely to the bolt, and to hold its engagement with the bolt when under tension. It is applicable to use with efficiency and large time saving in combination with bolts threaded at both ends for the application respectively of the common and my improved nut, which performs the function of the usual bolt head without requiring the time necessary for tightening the bolt having a fixed head.

A particular use of my improved device is, in combination with stud bolts, for drawing and holding plates and shapes together, for the purpose of and during riveting, as in ship construction, where much time is required for screwing up and unscrewing nuts on the usual headed bolts, a large part of which time can be saved by the use of my improved construction.

Figure 1:
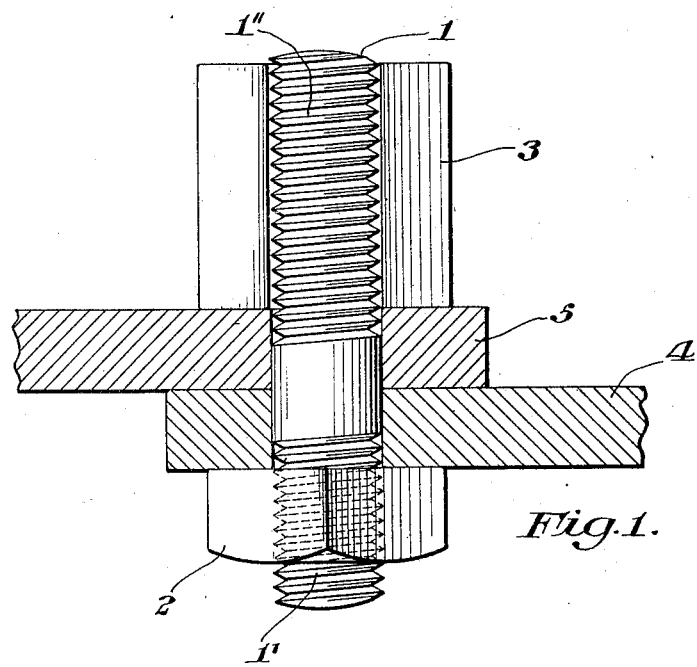
Figure 2:
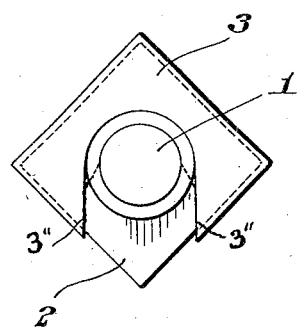
Figure 3:
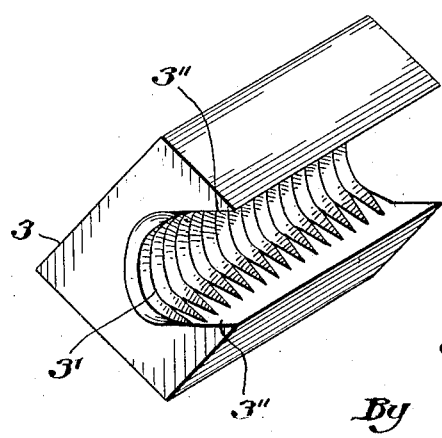

In the accompanying drawings, Figure 1 is a plan view of a bolt provided with a mutilated nut in accordance with my invention, as applied to use in clamping plates together, the plates being shown in section for the purpose of illustration; Fig. 2 is an end view of my improved nut applied to a bolt, and Fig. 3 is a perspective view of a detached nut made in accordance with my invention.

In the accompanying drawing there is shown a bolt 1 provided with the threaded ends 1' and 1" on which are engaged the respective nuts 2 and 3, the bolt passing through the engaging plates 4 and 5 which are clamped together by the pressure of the respective nuts.

The nut 3 is provided with an opening or recess bound by the threads 3' extending through a circular arc of approximately 180° and the sides 3" which are approximately tangent to the grooves between the threads, as shown. It is necessary only that the recess or opening and the nut generally be of such character as to permit its movement laterally with relation to the bolt, so as to effect the engagement and disengagement of the threads 3' with relation to thread 1" and to maintain a satisfactory engagement with the bolt when the latter is under tension. Preferably the depth of the opening (transverse to the axis of its threads) is greater than that of the diameter of the bolt so that the nut shall have an end bearing surface or surfaces disposed oppositely to its thread with relation to the axis of the bolt, and preferably the length of the opening (parallel to the axis of the threads) is approximately double that required in a full nut (as 2), such construction providing the necessary form and proportions for doing the desired work efficiently.

In use, the bolt 1 is inserted through the plates 4 and 5 with the nut 2 partly screwed up on the thread 1' and in engagement with the plate 4. The nut 3 is now placed on the opposite end of the bolt, in close relation to the plate 5, with the threads 3' in engagement with the threads 1", this being effected by registering the U-shaped opening of the nut with the bolt and moving such nut transversely to the bolt so as to effect the engagement. The nut 3 being in place on the bolt, the nut 2 is drawn up, generally by a turn or two, and the plates clamped together.

To remove the bolt, the nut 2 is turned back through say one or two turns, when the nut 3 will fall or can be moved transversely out of engagement with the bolt, which can then be withdrawn. The mutilated or recessed nut can also be knocked off the bolt which can then be removed without turning back the standard nut.

The improvement of my invention not only saves a great deal of time and increases production, but further it saves bolts by avoiding the usual occasions for rough usage and it insures first class workmanship because in its use tight fit or "tight iron" must be secured or the recessed nut will fall from its position on the bolt and render riveting impracticable.

Having described my invention, I claim:

1. The combination with a bolt provided with threaded sections, a complete nut engaged on one of said sections and a mutilated nut engaged on the other of said sections, said mutilated nut provided with an opening whereby it can be engaged and disengaged relatively to said bolt by moving it transversely thereto.

2. The combination with a headless bolt having two threads and nuts adapted for engaging the respective threads, one of said nuts being complete and the other provided with an opening extending laterally therethrough and having sides movable on opposite sides of said bolt to engage and disengage the respective threads, said opening having a depth transverse to said bolt greater than the diameter of said bolt.

In testimony whereof I have hereunto set my name this 7th day of June, 1920.

GEO. R. DE LONG.